Jan. 1, 1935. W. T. RAY 1,986,529
CONDITIONING LIQUIDS AND AIR AND OTHER GASES
Filed May 27, 1931 2 Sheets-Sheet 1
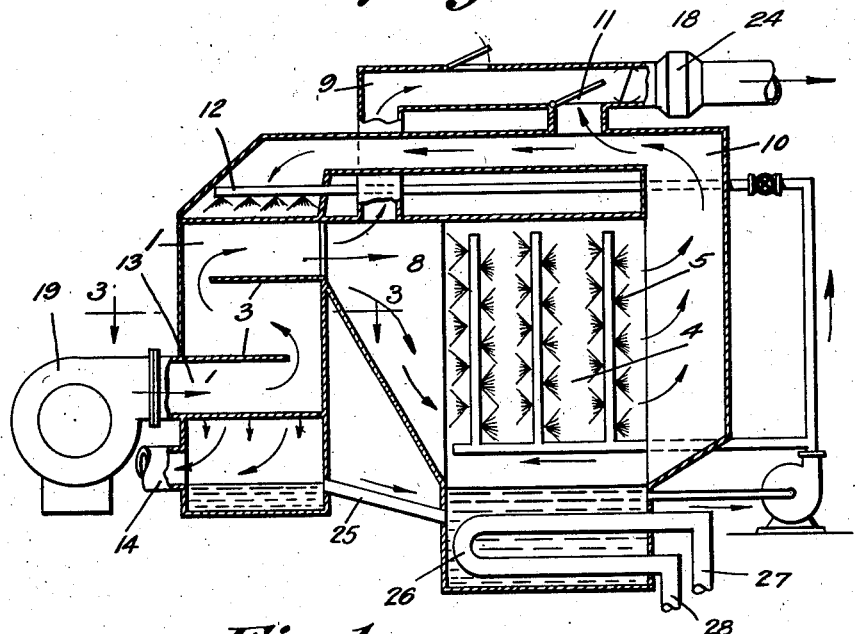
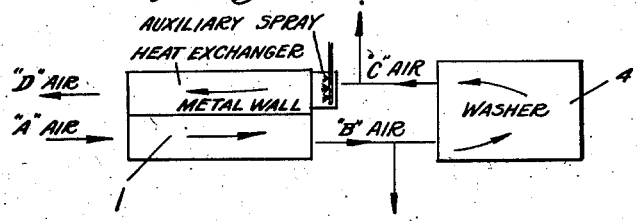
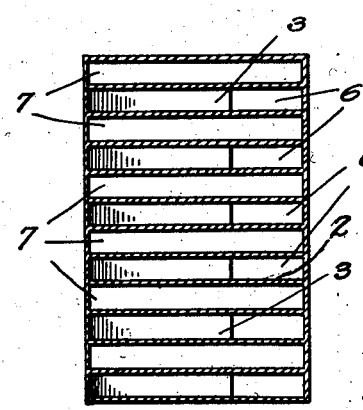

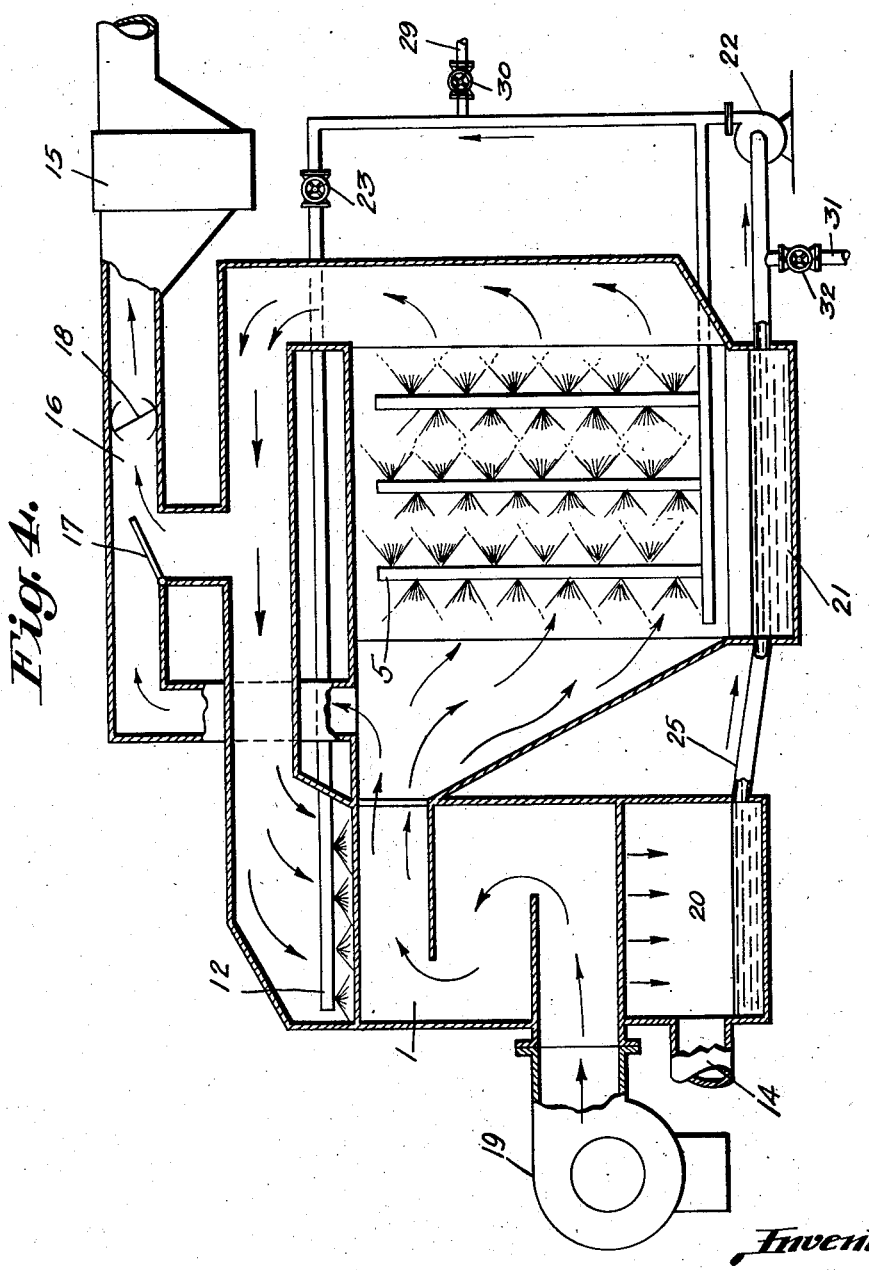

Patented Jan. 1, 1935

1,986,529

UNITED STATES PATENT OFFICE 1,986,529

CONDITIONING LIQUIDS AND AIR AND OTHER GASES

Walter T. Ray, Brewster, N. Y., assignor, by mesne assignments, to William W. Varney, Baltimore, Md.

Application May 27, 1931, Serial No. 540,422

12 Claims. (Cl. 261—10)

The object of my invention is a new process for reducing the temperature, or absolute humidity, or both, of air or gases without the application of refrigeration apparatus or adsorbing, or absorbing, material, other than an evaporative fluid.

A further object of my invention is a new method for reducing the temperature of liquids.

A further object of my invention is a new process whereby the temperature of the air circulated in an air conditioning system may be reduced materially below the wet-bulb temperature of the air entering the apparatus without recourse to mechanical refrigeration, or other external cooling means.

A further object of my invention is an improved process for conditioning air comprising a combined system of anhydrously cooling or heating air and adiabatically treating the same with an evaporative or absorbing fluid maintained at desired temperature by part or all of the air being treated.

A further object of my invention is an improved method and means for cooling the wash water in an air-conditioning apparatus, whereby the temperature reduction resulting from adiabatic humidification is utilized to lower the total heat of the incoming air and thus produce thermal equilibrium in the apparatus.

A further object of my invention has in view the partial cooling of air in an air conditioner by the adiabatic evaporation of water in the treatment of the air going through the conditioner and initially entering it at a relatively low humidity, in conjunction with a refrigerating plant, or other source of cold, to make up the deficiency in necessary temperature degradation of the wash water to deliver air at a desired temperature and humidity.

A further object of my invention is the cooling of water or other fluid below the wet-bulb temperature of the air or gas cooling the same at its point of supply.

A further object of my invention is the cooling of water or other fluid below the dew-point temperature of the air or gas cooling the same at its point of supply.

A further object of my invention is the providing of apparatus to carry out my improved process.

A further object of my invention is the combination and arrangement of apparatus to carry out my improved methods.

A further object of my invention is an improved method for the purification and cleaning of air or gases.

With the foregoing and other objects in view, my invention consists of the methods employed, combination and arrangement of systems, apparatus and means as hereinafter specifically set forth and illustrated in the accompanying drawings wherein is shown an embodiment of my apparatus; but it is understood that changes, variations and modifications may be resorted to which come within the scope of the claims hereunto appended.

In this specification, and claims, when I use the term "air", I mean air as ordinarily understood, the atmosphere, and also gases of any character, among which I might mention gases from boiler furnaces, illuminating gas, gases of metals, such as mercury vapor, metallic and other dusts, or any other gas or combination of gases which it might be desired to change in temperature, or to clean or condense.

Also, in this specification and claims, when I use the expression "absolute humidity", I mean the weight of vapor contained in air, regardless of its percentage of relative humidity, which latter decreases as the air is heated above its dew-point temperature, without changing the weight of contained vapor per pound of dry air.

In this specification and claims, when I use the term "adiabatic treating of air", I mean, substantially, a treatment of air whereby the total heat content of the air remains substantially a constant, allowing, of course, for heat radiation and convection to and from the apparatus and circumstances as herein described, wherein, without extra precautions, a considerable loss may be incurred one way or the other, depending upon relative conditions. And, when I use the term, "anhydrous treatment of air", I mean the treatment of air without affecting its moisture content, such as in a cooler having conducting (metallic) walls separating it from the cooling element, or by sprays as of mercury, or other condensible or evaporative fluids.

As this application is somewhat of a counterpart of, or may be used in connection with, my application on this subject, filed Jan. 31, 1931, Ser. No. 512,609, I make reference thereto herein.

My invention has wide application and uses; I believe, however, that a description of the principle, as schematically shown in Fig. 1, and of an embodiment, as shown in the several views, will be sufficient for illustrative purposes, and will enable those skilled in the art to apply my system to any known gas or combination of gases, as may be desired.

In the drawings of the herein-described embodiment of my invention, Figure 1, as suggested above, is a schematic drawing of the air flow plan of my invention, suggesting the points of admission, withdrawal and discharge of the air; Fig. 2 is a longitudinal cross-section in elevation illustrating an apparatus performing my process of air conditioning, Fig. 3 being a horizontal cross-section view taken through 3—3 of the heat exchanger shown in Fig. 2, and Fig. 4 is a view somewhat similar to that shown in Fig. 2 provided with a super-cooling means, as will be hereinafter described.

Similar numerals refer to similar parts throughout the several views.

1 is a heat exchanger which comprises a passage for incoming air and a passage for outgoing air, whereby heat may be exchanged between the incoming and outgoing air without co-mingling. As shown, it comprises in this design a plurality of vertical partitions 2 separating the incoming and outgoing air into alternating compartments, and within these compartments are baffles 3, thus insuring a tortuous passage for both currents of air counter-current.

4 is the washer, or humidifier, and many consist of any of the ordinary types, such as spray, or shed, or other means for contacting a liquid with a gas; in the case shown, it is provided with sprays 5. 6 are the entering air passages or compartments in heat exchanger 1. 7 are the air passages or compartments for the discharged air in heat exchanger 1. Connecting supply compartments 6 of heat exchanger 1 is vestibule 8 ("B"), conducting the air from heat exchanger to the washer, and provided with necessary outlets 9 for bleeding. Compartments 7 of heat exchanger 1 are connected to the discharge end of the washer by vestibule 10 ("C"); this vestibule is also provided with a bleeder at 11.

Between washer 4 and heat exchanger 1 in vestibule 10 ("C") is provided means for wetting the air passing through to insure a superabundance of fluid therein and surplus water of suspension in the air in its passage through heat exchanger 1 whereby a maximum evaporation of said water may be had, absorbing heat from said air, and the same being discharged at practically saturation, thus availing myself of the absorption of all the heat possible by the discharged air, having in mind its expansion caused by its being heated by the incoming air through the heat exchanger. Care must be taken, however, not to use more water than is necessary for this evaporative purpose, as the water used by me in the apparatus described has been cooled and, therefore, if wasted would be a loss.

In Fig. 2 I have shown a means for providing such additional moisture by means of spray 12. This may be located at any convenient point, and it need not necessarily be of spray type, as any means for providing moisture to the air would accomplish the same result, the object being as above stated to vaporize as much water as possible on the heating of the discharged air by the incoming raw air, thereby affecting the maximum amounting of cooling from this source.

In the utilization of the bled air from either or both of the vestibules, to get the proper dry-bulb temperature and humidity above that of said vestibules, heater 24 may be supplied, if desired.

Referring to Fig. 4, 15 is an under-cooling means located in the bleeder discharge duct 16 from either vestibule 8 or 10, or both. The control for admission of air from vestibule 10 is by means of damper 17, and the control for the admission of air from vestibule 8 is also from damper 17, the same being a mixing damper and can be at either extreme or at any intermediate position. 18 is a closing damper to prevent any bleeding and in practice is used at night when the apparatus is running for the sole purpose of cooling the wash water.

The entering air at 10 is discharged at exit 14, the bleeding valves 17 and 18 being closed. I might remark here that the amount of entering air is the amount of exit air, less the portions drawn off between entering and exit.

Air under-cooler 15 consists of any cooling means, such as artificial refrigeration, or ice, or solid refrigerant, details of which I do not claim herein, the same being the subject of another application. 19 is a blower that may be used when necessary forcing the raw air into the apparatus. Any means, however, may be used for circulating the air; many prefer exhaust fans as a discharge in place of the blower shown. In fact, no blower is essentially required for the operation of the process, as natural draft may be availed of. 20 is the sump at outlet 14 to collect any excess moisture that may be provided through sprays 12. 21 is the washer sump. Sumps 20 and 21 are preferably connected so that the superfluous water in sump 20 may be drawn to sump 21, and means 25 is provided. The sprays 5 and 12 are supplied from sump 21 by pump 22. 23 is the valve controlling the discharge from spray 12.

Referring to the wash water or evaporative liquid used in the adiabatic treatment of the air, as explained herein, the same is cooled to a certain point where a heat balance is obtained under the working conditions of the apparatus used. This temperature ordinarily is very much lower than the wet-bulb temperature of the entering raw air as herein mentioned. I utilize this lowering of the temperature of the treating water as a means of refrigeration, and either bleed this water, making up the loss with warmer water, this may be accomplished by bleed pipe 31 controlled by valve 32 and supply pipe 29 controlled by valve 30 or abstract cold from the same by the anhydrous treatment, as shown in Fig. 2, by ducts in the sump where liquid such as water or gasoline, or other liquids, may be cooled, or where gases or air may be passed through for cooling; said ducts being numbered 26 and having inlet and outlet 27 and 28, respectively. One use for which this is applicable is the cooling of gasoline, alcohol, etc., to reduce its vapor tension.

The operation of my invention is as follows:

As an illustration of one application, my invention consists, in part, of two primary elements when used in a single stage; a heat exchanger and a washer.

Raw or atmospheric air is introduced into the washer compartment 6 which is provided for the incoming air. This entrance I have designated as 13, the supply ("A"). The air emerges from compartment 6 and enters vestibule 8 ("B"). In passing through vestibule 8 a part of it may be drawn off or bled, as at this point it has a lower dry and wet-bulb temperature than on entering the exchanger. The air leaving the vestibule 8 enters washer, or humidifier 4, in which washer it tends to cool the wash water; the dry bulb temperature of the air being low, and if its humidity is also low it will absorb water abstracting heat in its vaporization. The air leaves the washer and enters vestibule 10 ("C") where a part of it may be bled off for use as desired, it being practically saturated but of a lower temperature than of the air in vestibule 8. If air is to be bled from vestibule 10 ("C"), it is desirable that eliminators be placed between the washer and the point of bleeding in order to remove entrained moisture; if no bleeding, the entrained moisture is useful in its return passage through the heat exchanger. The air leaves vestibule 10 ("C"), entering the heat exchanger compartment 7 and discharges at discharge 14 ("D").

The air in vestibule 10, with the apparatus working normally, would be practically saturated, its dry and wet-bulb temperatures being substantially the same. These dry and wet-bulb temperatures in vestibule 10 ordinarily under normal conditions would be a considerable number of degrees lower than the wet-bulb temperature of the supply air at "A". This will be more particularly described later.

In passing through the heat exchanger the dry-bulb temperature rises, owing to the warmer air entering the heat exchanger at "A". This causes a difference between the wet and dry-bulb temperatures and in order to keep these temperatures as near together as possible, water is supplied to the air as required to maintain it practically saturated, as heretofore mentioned.

The air in passing through the washer 4 causes the wash-water to drop in temperature until equilibrium in temperature is attained between the wash water and the wet-bulb temperature of the air being washed. It will be seen from this that where water is used above this temperature initially this is a means for reducing the temperature of the wash water. This I avail myself of, as will be further hereinafter set forth.

To further elucidate my process of wash water cooling and air cooling, I will recapitulate and give one definite illustration from a test carried out which will perhaps explain more definitely than mere statements.

Referring particularly to the diagram shown in Figure 1, I will give the data of a test wherein air was bled from "C" as well as discharged at "D", the raw air entering at "A". The raw air entering at "A" had dry-bulb temperature of 82° and wet-bulb temperature of 63°; the same air at "B" had a dry-bulb temperature of 71° and a wet-bulb temperature of about 59°. After passing through the washer the air in "C" had a dry-bulb temperature of 60°, and a wet-bulb temperature of about 59°, and part of this air was bled out at "C". The air discharging at "D" had a dry-bulb temperature of 78° and a wet-bulb temperature of about 64°. At the same time the wash water was practically in equilibrium with the wet-bulb temperatures of the air at "B" and "C". In that test, no water was discharged into the air after leaving the washer; in other words, spray 12 was not used.

Another illustration is where the air was maintained substantially saturated in the heat exchanger and discharged in the same condition at "D". Air entered "A" at 94° dry-bulb temperature and 64° wet-bulb temperature; at "B" it had a dry-bulb temperature of 69° and a wet-bulb temperature of 54°; at "C" the air had a dry-bulb temperature of 56° and a wet-bulb temperature of about 55½°; part of this air at "C" was being bled out. At "D" the discarded air had a dry-bulb temperature of about 79° and a wet-bulb temperature of about 71°.

The above illustrations are given simply for the purpose of showing the operation of my process and apparatus, and not as definite figures, performances, or otherwise limiting or affecting my process, as conditions vary from time to time, and I do not limit myself in any way to any figures herein mentioned.

In the above experiments the wash water initially was much above the temperatures mentioned. The apparatus was run until the wash water was cooled and the air and wash water temperatures were uniform in the washer; this was maintained substantially the same, the difference being attributed principally to radiation and other defects in the apparatus used.

No controls are shown in this application, other than the dampers and valves mentioned. It is understood, however, that pump and blower controls for regulating the speed are supplied, as well as means for operating the various dampers, all of which are omitted, the same being understood as being desirable for the best operation of the apparatus. Of course, the blowers and pump are operated by any well-known means not shown, this specification and the drawings being schematic as heretofore stated to illustrate my process and apparatus requirements.

Having thus described my invention, what I claim and desire to secure by Letters Patent is:

1. An air treating process comprising the heating of discharged air by the entering raw air whereby the entering raw air is cooled, then withdrawing a portion of said air thus cooled before further treatment, then adiabatically treating the remainder of said air with an evaporative fluid between the said incoming and outgoing thereof.

2. An air treating process comprising the cooling of incoming raw air by the discharged air for the purpose of heat exchange between the said two currents of air, the said incoming air then being adiabatically treated with an evaporative fluid between its said incoming and its said discharge to lower its temperature, and the bleeding of a portion of said fluid while said air is being treated as above and supplying in place thereof fluid of a higher temperature to maintain the requisite amount of fluid for said air treatment.

3. An air treating process comprising the heating of discharged air by the entering raw air whereby the entering raw air is cooled, the said incoming air being then adiabatically treated with an evaporative fluid between the said incoming and outgoing thereof to lower its temperature, and while being so treated abstracting a portion of said air after the adiabatic treatment and before the heating of the remainder of said air by the said incoming air, and the bleeding of a portion of said fluid while said air is being treated as above and supplying in place thereof fluid of a higher temperature to maintain the requisite amount of fluid for said air treatment.

4. An air treating process comprising the heating of discharged air by the entering raw air whereby the entering raw air is cooled, then withdrawing a portion of said air thus cooled, then adiabatically treating the remainder of said air with an evaporative fluid between the said incoming and outgoing thereof, and the bleeding of a portion of said fluid while said air is being treated as above and supplying in place thereof fluid of a higher temperature to maintain the requisite amount of fluid for said air treatment.

5. An air treating process comprising the heating of discharged air by the entering raw air whereby the entering raw air is cooled, then withdrawing a portion of said air thus cooled, then adiabatically treating the remainder of said air with an evaporative fluid, then abstracting a portion of said air after the adiabatic treatment and before the heating of the remainder of said air by the incoming air, and the bleeding of a portion of said fluid while said air is being treated as above and supplying in place thereof fluid of a higher temperature to maintain the requisite amount of fluid for said air treatment.

6. The process of air conditioning consisting of precooling air comprising, cooling said air by a discharged portion of said air after having been treated, contacting said air after said cooling with an evaporative liquid, circulating said liquid in contact with said air for the purpose of cooling the same, and the anhydrous interchange of heat from said evaporative liquid by a fluid or gas whereby the said evaporative liquid may be warmed.

7. A refrigerating apparatus comprising an air heat exchanger through which the entering air is cooled by the discharged air, a humidifier in which the air while in the apparatus is humidified by an evaporative liquid, and a heat exchanger whereby said liquid may have its heat content varied consisting of means for changing the temperature of a liquid or gas by said evaporative liquid in said exchanger.

8. An apparatus for cooling a fluid by the adiabatic treatment of air comprising, a heat exchanger through which the air enters, a humidifier by which said air is humidified by a fluid, means for conducting said air to and from said heat exchanger whereby the discharged air cools the incoming air, and means for bleeding said fluid from said humidifier after having been cooled by the air passing through the same and supplying a fluid of a higher temperature in place of the fluid so bled to maintain the requisite amount of fluid for said air treatment.

9. An air treating process comprising the heating of discharged air by the entering raw air whereby the entering raw air is cooled, then withdrawing a portion of said air thus cooled before further treatment, then adiabatically treating the remainder of said air with an evaporative fluid, then abstracting a portion of said air after the adiabatic treatment and before the heating of the remainder of said air by the said incoming air.

10. An apparatus for cooling air comprising means for anhydrously treating discharged air from said apparatus by the entering raw air to said apparatus whereby the entering raw air is cooled, means provided for withdrawing a portion of said air thus cooled before further treatment thereof, means for adiabatically treating the remainder of said cooled air with an evaporative fluid, means for abstracting a portion of said air after the adiabatic treatment and before the heating of the remainder of said air by the said entering air.

11. An apparatus for cooling air comprising means for anhydrously treating discharged air from said apparatus by the entering raw air to said apparatus whereby the entering raw air is cooled, means provided for withdrawing a portion of said air thus cooled before further treatment thereof, means for adiabatically treating the remainder of said cooled air with an evaporative fluid, before the discharge of said air through said anhydrous means for cooling the entering air.

12. An apparatus for conditioning air by the adiabatic treatment of air comprising a heat exchanger through which the air enters, a humidifier by which said air is humidified by a fluid, means for conducting said air to and from said heat exchanger whereby the discharged air cools the incoming air, means for supplying an evaporative fluid to said outgoing cooler air while in said heat exchanger, thereby tending to maintain the same saturated as its temperature rises in said heat exchanger.

WALTER T. RAY.